United States Patent [19]

Dutton

[11] 4,221,391
[45] Sep. 9, 1980

[54] MULTIPLE SEGMENTED CHUCK JAW

[76] Inventor: Anthony E. Dutton, 2C Queens Terrace, Queen St., Southington, Conn. 06489

[21] Appl. No.: 957,858

[22] Filed: Nov. 6, 1978

Related U.S. Application Data

[63] Continuation of Ser. No. 820,577, Aug. 1, 1977, abandoned.

[51] Int. Cl.³ .............................................. B23B 31/00
[52] U.S. Cl. ...................................... 279/123; 269/271
[58] Field of Search ........................ 279/123, 110, 1 A; 269/271, 280, 282, 283, 284; 81/180 B; 24/263 DT

[56] References Cited

U.S. PATENT DOCUMENTS

| 1,372,726 | 3/1921 | Sloan | 279/123 |
| 1,454,148 | 5/1923 | Bisset | 279/123 |
| 2,464,507 | 3/1949 | Hohwart et al. | 279/123 |

FOREIGN PATENT DOCUMENTS 39934  3/1932  France ..................................... 279/123

Primary Examiner—Gil Weidenfeld

[57] ABSTRACT

A multiple segmented chuck jaw, operable for holding a workpiece while a work operation is being performed thereon, consisting of a first portion comprising a master and a second portion comprising an insert shaped to meet the requirements of a given application. The master and the shaped insert are each provided with cooperating dovetail means operable for detachably securing the master and the shaped insert together. The master is further provided with slot means operable to permit flexing of the master to increase the gripping force applied to the shaped insert, when the latter is secured in mounted relation to the master. Other inserts shaped to meet differing application requirements are also capable of being employed with the master without necessitating a modification in the construction of the latter. As a result of the multiple segmented construction of the chuck jaw, the master and the shaped insert are each capable of being hardened independently to increase the durability thereof.

21 Claims, 4 Drawing Figures

MULTIPLE SEGMENTED CHUCK JAW

This is a continuation of application Ser. No. 820,577, filed Aug. 1, 1977 now abandoned.

BACKGROUND OF THE INVENTION (1) Field of the Invention

My invention relates to chuck jaws usable as a holder for a workpiece, and more particularly to an improvement in chuck jaws which are customarily hardened to increase the durability thereof.

(2) Description of the Prior Art

It has long been known in the prior art to employ chuck jaws as the means by which a workpiece is held, while some form of work operation is being performed thereon. Any such chuck jaw must meet a multiplicity of requirements. For instance, the chuck jaw must include a gripping portion which is suitably configured so as to be compatible with the shape of the workpiece whereby to ensure that a secure grip is capable of being established between the chuck jaw and the workpiece.

Secondly, the chuck jaw should be sufficiently durable so as to be capable of satisfactorily resisting the wear and tear to which the chuck jaw is subjected while functioning as a holder for a workpiece. Commonly, the chuck jaw, after machining, is hardened to increase the durability thereof.

Thirdly, it is desirable that the chuck jaw be reusable, if possible. The term reusable as used herein refers to the chuck jaw's ability to be subsequently used with other workpieces of differing shapes, in addition to the chuck jaw's ability to be used repetitively with workpieces which embody substantially identical gripping surfaces.

Heretofore, it has been found that the prior art most often has employed chuck jaws which are of one piece construction. Moreover, such chuck jaws are commonly made of soft steel. This enables the chuck jaw to be cut and shaped, i.e., machined, to fit the requirements of the particular application in which it is desired to utilize the chuck jaw. Often, chuck jaws of one piece construction are not hardened. Consequently, one finds that the life of the chuck jaw is relatively short. The reason for this is that once hardened the chuck jaw is virtually unmachinable.

Insofar as concerns reusability of the chuck jaw, the prior art practice has been to recut and reshape the chuck jaw to meet other applications as the need therefor arises. At some point however, the chuck jaw is no longer susceptible to being recut and reshaped. Therefore, the chuck jaw must be discarded. Because of this need to recut and reshape the chuck jaw, the latter is not hardened, i.e., the chuck jaw can not be hardened, if it is desired to be able to subsequently recut and reshape the chuck jaw.

It can thus be seen that prior art chuck jaws have commonly suffered from one or the other of two major disadvantages. Namely, in those instances wherein the chuck jaw has been hardened following shaping to improve the durability thereof, the potential for reusability of the chuck jaw has been significantly restricted. On the other hand, in those instances wherein the chuck jaw has not been hardened in order to increase its potential for reuse, the life of the chuck jaw has been significantly shortened by virtue of the fact that the chuck jaw has not been hardened in an effort to increase the durability thereof.

There has thus existed a need to provide a chuck jaw which does not suffer from either of the two significant disadvantages.

OBJECTS OF THE INVENTION

It is therefor an object of the present invention to provide a novel and improved chuck jaw which is capable of functioning as a holder for a workpiece.

It is another object of the present invention to provide such a chuck jaw which embodies a gripping portion having a configuration which is complementary to the shape of the gripping surface of the workpiece.

A further object of the present invention is to provide such a chuck jaw which is susceptible to being reused to hold workpieces of differing shapes.

A still further object of the present invention is to provide such a chuck jaw which is characterized by its durability.

Yet another object of the present invention is to provide such a chuck jaw which is further characterized by its improved gripping action.

Yet still another object of the present invention is to provide such a chuck jaw which is relatively simple in construction, easy to employ, and relatively inexpensive to provide.

SUMMARY OF THE INVENTION

In accordance with the preferred form of the invention there is provided a novel and improved chuck jaw which is operable for holding a workpiece while a work operation is being performed thereon. The chuck jaw consists of multiple segments including a first portion comprising a master and a second portion comprising an insert. The latter insert is shaped to meet the geometrical requirements of a given application. The master has a dovetail groove formed therein extending the entire length of one face thereof. The insert has formed therein a tenon of complementary shape to the dovetail slot in the master so as to be receivable therein. By means of this dovetail construction, the master and the insert are capable of being detachably secured together. The master is additionally provided with a slot formed therein so as to extend perpendicular to the major axis of the dovetail groove with which the master is also provided. The slot is operative to permit flexing of the master thereby to increase the gripping force which the master is capable of applying to the shaped insert, when the latter is positioned in mounted engagement with the master. The master and the insert are each capable of being independently hardened so as to improve the durability thereof. For applications requiring gripping portions of differing geometrical configurations, the shaped insert may be discarded, and a new insert shaped to the needs of the new application substituted therefor. Namely, the new insert may replace the original insert in mounted relation on the master, without necessitating the effecting of any modification in the construction of the master. Thus, it can be seen that the master is retainable while the shaped insert which constitutes only a small portion of the total chuck jaw and which is relatively inexpensive to provide is the only portion of the chuck jaw which may need to be discarded. The master is also preferably provided with stop means operable to ensure repeatability of positioning of the shaped insert in the dovetail groove provided in the master.

DESCRIPTION OF THE PREFERRED EMBODIMENT

Figure 1:
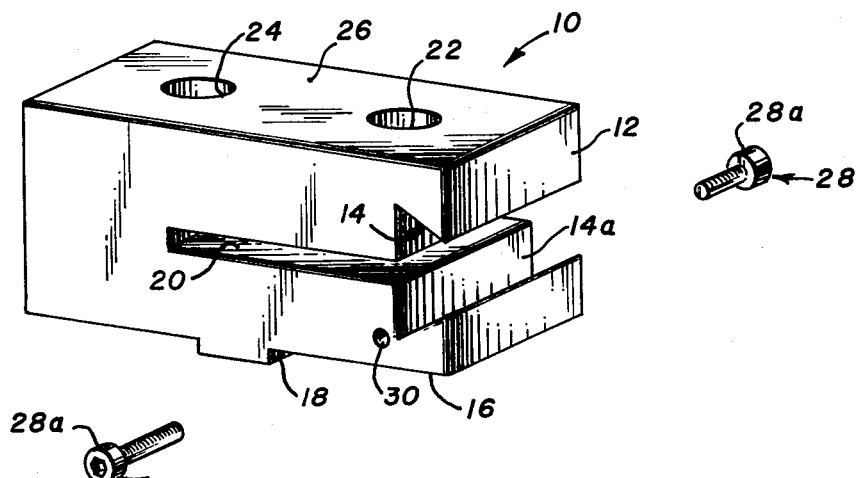
FIG. 1 is an exploded perspective view of the master of a chuck jaw constructed in accordance with the present invention.

Referring now to FIG. 1 of the drawing, there is illustrated therein the master, generally designated by reference numeral 10, of a multiple segmented chuck jaw constructed in accordance with the present invention. As depicted therein, the master 10 is generally rectangular in configuration. One face 12 of the master 10 has a dovetail groove 14 machined therein for a purpose yet to be described. Preferably, the dovetail groove 14 as shown in FIG. 1 extends the entire length of the face 12 of the master 10. Although not all of the other faces of the master 10 are visible in FIGS. 1 and 2 of the drawing, it is to be understood that all of the other faces of the master 10 are substantially planar in configuration, except for the bottom face 16 as viewed with reference to FIGS. 1 and 2, which has a boss 18 extending therefrom. The boss 18, which is preferably formed as an integral part of the bottom face 16 of the master 10, is intended to cooperate, in a manner well known to those skilled in the art, with a chuck (not shown) to which the chuck jaw of the present invention is designed to be fastened.

Continuing with a description of the master 10, it is further provided with a slot 20 which is machined in the face 12. More specifically, the slot 20 extends from the base 14a of the dovetail groove 14 into the interior of the master 10. As best understood with reference to FIGS. 1 and 2 of the drawing, the slot 20 in accordance with the preferred embodiment of the invention extends the entire width of the master 10 and approximately two-thirds of the length thereof. In a manner which will be described more fully hereinafter, the slot 20 is operative to permit the master 10 to flex to increase the amount of gripping force which the master 10 is capable of applying. In this regard, it is noted that the major axis of the slot 20 is perpendicular to the major axis of the dovetail groove 14.

For purposes of mounting the chuck jaw of the present invention to a chuck (not shown), the master 10 is preferably provided with a pair of mounting holes 22 and 24. Although a pair of mounting holes 22 and 24 have been depicted in the drawing, it is to be understood that a greater or a lesser number of mounting holes may be provided for this purpose in the master 10 without departing from the essence of the invention. In accordance with the embodiment of the invention depicted in the drawing, the mounting holes 22 and 24 are located in the top face 26, as viewed with reference to FIGS. 1 and 2, of the master 10. As illustrated in the drawing, each of the mounting holes 22 and 24 extends through the entire body of the master 10, i.e., from the top face 26 through to the bottom face 16 of the master 10. Moreover, each of the mounting holes 22 and 24 preferably includes a counterbore 22a and 24a, respectively, to enable the head of a mounting fastener (not shown) to be received therein, and therefore avoid the undesirable feature of having the heads of the mounting fasteners (not shown) protrude outwardly beyond the planar surface of the top face 26.

Completing the description of the physical structure of the master 10, the latter in accordance with the preferred embodiment of the invention is also provided with stop, i.e., fastener means 28. The latter fastener means 28 is operative to ensure repeatability of positioning relative to the dovetail groove 14. For this purpose a threaded hole 30 is machined through the master 10 adjacent to the base 14a of the dovetail groove 14. As illustrated in FIG. 1 of the drawing, the fastener means 28 preferably takes the form of a flat headed screw, which can be adjustably threaded into the threaded hole 30 to the extent desired whereby the head of the screw 28 is operative as a stop. One or more screws 28 each having an enlarged head portion 28a may be employed. To this end, the threaded hole 30, as noted above previously, extends the entire width of the master 10. Consequently, either end of the threaded hole 30 is capable of receiving a screw 28 in threaded engagement therewith.

Figure 3:
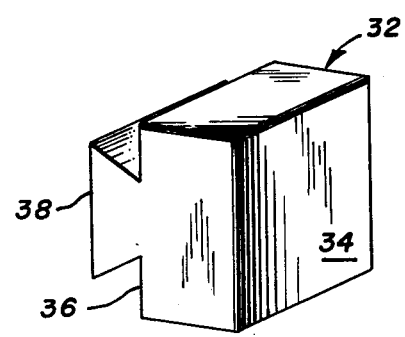
FIG. 3 is a perspective view of one form of a shaped insert which is capable of being associated with the master of a chuck jaw constructed in accordance with the present invention.

Referring now to FIG. 3 of the drawing, there is illustrated therein an insert 32, which constitutes the second portion of the multiple segmented chuck jaw of the present invention. The insert 32 as shown in FIG. 3 comprises a substantially rectangular member having a vertically flat front face 34. The rear face 36, as viewed with reference to FIG. 3, of the insert 32 is provided with a tenon 38. The latter tenon 38 is suitably dimensioned so as to be receivable with a sliding fit within the dovetail groove 14 of the master 10, in a manner to which further reference will be had subsequently. Although not all of the faces of the insert 32 are visible in FIG. 3 of the drawing, it is to be understood that the other faces of the insert 32 which are not shown are substantially planar in construction similar to the front face 34 of the insert 32, which is visible in FIG. 3. Once the front face 34 of the insert 32 has been suitably shaped for the specific application in which it is intended to employ the chuck jaw, the insert 32 may be hardened so as to improve the durability thereof.

Figure 2:
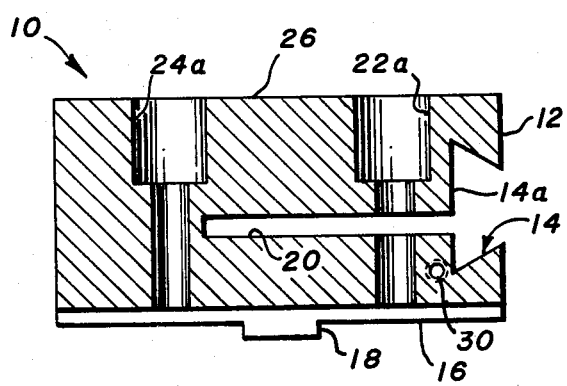
FIG. 2 is a side elevational view of the master of the chuck jaw constructed in accordance with the present invention.
Figure 4:
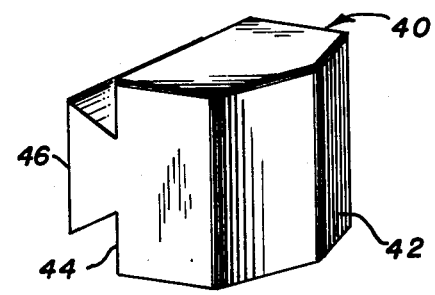
FIG. 4 is a perspective view of another form of a shaped insert which is capable of being associated with the master of a chuck jaw constructed in accordance with the present invention.

With reference next to FIG. 4 of the drawing, there is illustrated therein another embodiment of insert, generally designated by reference numeral 40, which is capable of being employed with the master 10 of FIGS. 1 and 2 of the drawing. The insert 40 commonly would be employed as a replacement for the insert 32 for those applications in which the former is more suitable as a holder than is the insert 32. The insert 40 differs from the insert 32 only in the shape of the front face 42 thereof. As seen with reference to FIG. 4 of the drawing, the front face 42 of the insert 40 has a triangularly shaped configuration in contract to the front face 34 of the insert 32 which is substantially planar. The rear face 44, as viewed with reference to FIG. 4 of the drawing, in a manner similar to the rear face 36 of the insert 32 is also provided with a tenon 46, which is suitably dimensioned so as to be receivable with a sliding fit in the dovetail groove 14 of the master 10. Although two forms of inserts; namely, the insert 32 and the insert 40 have been illustrated in the drawing, it is to be understood that the inserts 32 and 40 merely exemplify two of the many different geometrical shapes which the shaped insert of the chuck jaw of the present invention may take. Consequently, it is to be understood that inserts having shapes different from that of either the insert 32 or the insert 40 may be employed with the master 10 without departing from the essence of the present invention. As in the case of the insert 32, once the insert 40 has been suitably shaped so as to meet the geometrical requirements of the application in which it is to be used, the insert 40 may be hardened for purposes of improving the durability thereof.

Turning now to a description of the method of assembly of the chuck jaw of the present invention, it will be assumed for purposes of this description that the insert 32 is to be employed with the master 10. However, it is to be understood that the insert 40 and the master 10 would be assembled in the same manner as that described in connection with the assembly of the master 10 and the insert 32. Similarly, any other insert sought to be joined to the master 10 would be assembled in the same fashion as that to be described. It is to be understood that preparatory to the assembly of the insert 32 and the master 10, both the insert 32 and the master 10 have been suitably hardened so as to improve the durability thereof. For purposes of mounting the insert 32 to the master 10, it is only necessary to guide the tenon 38 of the insert 32 into sliding engagement with the side walls which serve to define the dovetail groove 14 of the master 10. With the tenon 38 so positioned in the dovetail groove 14, a flat headed screw 28 may be threaded into the threaded hole 30 until the head 28a of the screw 28 is suitably located so as to function as a stop for the insert 32. With the insert 32 so joined to the master 10 so as to form a chuck jaw in accordance with the present invention, the master 10 and the insert 32, i.e., the chuck jaw, is suitably secured to a chuck (not shown) through the use of mounting fasteners, i.e., screws (not shown) inserted in the mounting holes 22 and 24 of the master 10. As the mounting screws are being threaded into the chuck the upper portion, as viewed with reference to FIG. 1, of the master 10 flexes or moves slightly by virtue of the slot 20 which has been provided therein. The result of this flexing is to increase the gripping force being applied to the tenon 38 of the insert 32, thereby to effect a secure gripping action between the master 10 and the insert 32. To replace the insert 32 with the insert 40, it is simply necessary to loosen the mounting screws (not shown) positioned in the mounting holes 22 and 24, slide the tenon 38 of the insert 32 out of the dovetail groove 14, and then slide the tenon 46 of the insert 40 into the dovetail groove 14. It may be necessary to change the position of the screw 28, which is easily accomplished simply by changing the extent to which the screw 28 is threaded into the threaded hole 30. From the above description it can be seen that the master 10 and the insert 32 or the insert 40 are characterized by the fact that they feature quick set-up. Namely, it is a relatively simple task to join the insert 32 or the insert 40 to the master 10 to form the chuck jaw of the present invention. Moreover, the chuck jaw of the present invention is characterized by its versatility. That is, the master 10 is capable of receiving in secured relation therein a variety of inserts differing in length and/or shape.

Thus, in accordance with the present invention there has been provided a novel and improved chuck jaw which is capable of functioning as a holder for a workpiece. The subject chuck jaw of the present invention embodies a gripping portion having a configuration which is complementary to the shape of the gripping surface of the workpiece. In accord with the present invention, the chuck jaw is susceptible to being reused to hold workpieces of differing shapes. Moreover, a chuck jaw has been provided which is characterized by its durability. The chuck jaw of the present invention is further characterized by its improved gripping action. Finally, in accord with the present invention a chuck jaw has been provided which is relatively simple in construction, easy to employ, and relatively inexpensive to provide.

While only one embodiment of my invention has been shown, it will be appreciated that modifications thereof, some of which have been noted in the preceding description, may readily be made by those skilled in the art. I therefore intend by the appended claims to cover the modifications specifically referred to herein as well as all other modifications which fall within the true spirit and scope of my invention.

What I claim as new and desire to secure by Letters Patent of the United States is:

1. A master for a multiple segmented chuck jaw, the master capable of being secured to a chuck and capable of cooperation with an insert having dovetail means, the master comprising:

a body having a first face;

dovetail means formed in said first face adapted for cooperation with the insert for joining said master and said insert together in secured relation to each other;

a slot formed in the base of said dovetail means of said body, said slot extending longitudinally of said master for a distance sufficient to permit said dovetail means to be flexed to exert a gripping force on the insert; and means for simultaneously securing said body to the chuck and flexing the dovetail means on said master to exert the gripping force on said insert.

2. A master as defined in claim 1 wherein said means for simultaneously securing and flexing comprises at least one mounting hole extending through the entire body and the width of the slot.

3. A master as defined in claim 2 wherein said hole includes a counter bore which provides an annular securement surface, said surface capable of being urged toward the chuck to secure the insert to the master.

4. A master for a multiple segmented chuck jaw as defined in claim 1 further including stop means mounted on said body adjacent to said dovetail means, said stop means being adapted to engage an insert engaged in said dovetail means to determine the location thereof.

5. A master for a multiple segmented chuck jaw as defined in claim 4 wherein said stop means includes a flat headed screw threadably engageable in a threaded hole provided therefor in said body, said flat headed screw having an enlarged head portion engageable with an insert when the insert is joined to the master.

6. A multiple segmented chuck jaw for a workpiece, the chuck jaw being capable of being secured to a chuck, said jaw comprising:

an insert including a first surface and a second surface, said first surface being at least partly contoured to conform to a surface of a workpiece, and said second surface having dovetail means formed thereon;

a master including a first face having a dovetail means formed therein cooperable with said dovetail means of said insert for joining said master and insert together in secured relation to each other;

a slot formed in the base of said dovetail means of said master and extending longitudinally of said master for a distance sufficient to permit said dovetail means to be flexed to exert a gripping force on the insert; and means for simultaneously securing said master to a chuck and flexing the dovetail means of said master to exert the gripping force on said insert.

7. A multiple segmented chuck jaw according to claim 6 wherein said means for simultaneously securing and flexing comprises a hole extending through the entire master and through the slot.

8. A multiple segmented chuck jaw according to claim 7 wherein said hole further includes a counter bore defining an annular surface, said annular surface capable of being urged towards the chuck to secure the master to the insert.

9. A multiple segmented chuck jaw for a workpiece comprising:

an insert including a first surface and a second surface, said first surface being at least partly contoured to conform to a surface of a workpiece to be engaged thereby, and said second surface having dovetail means formed thereon;

a master including a first face having dovetail means formed thereon cooperable with said dovetail means of said insert for joining said master and said insert together in secured relation relative to each other, said master further including flex means for increasing the gripping force exerted on said insert by said master when said master and said insert are joined together; and stop means mounted on said master adjacent to said dovetail means, said stop means contacting said insert for determining the location of said insert relative to said master when said dovetail means are engaged, said stop means including a flat-headed screw threadably engaged in a threaded hole provided in said master, said flat-headed screw having an enlarged head portion which contacts said insert.

10. A multiple segmented chuck jaw as defined in claim 9 wherein said flex means comprises a slot formed in the base of said dovetail means of said master and extending longitudinally of said master.

11. A multiple segmented chuck jaw as in claim 10 wherein said slot extends perpendicular to the major axis of said dovetail means of said master.

12. A multiple segmented chuck jaw as defined in claim 9 wherein said dovetail means of said insert comprises a tenon.

13. A multiple segmented chuck jaw as defined in claim 12 wherein said dovetail means of said master comprises a dovetail groove.

14. A master for a multiple segmented chuck jaw comprising:

a body having a first face;

dovetail means formed in said first face adapted for cooperation with a dovetail means for an insert for joining said master and an insert together in secured relation to each other;

flex means formed in said body, said flex means being operable to increase the gripping force exerted on an insert by said master when said master and said insert are joined together; and said master further including stop means adjacent to said dovetail means of said master, said stop means being engagable with said insert for determining the location of said insert relative to said master when said master and said insert are in joined relation relative to each other, and said stop means including a flat headed screw threadably engagable in a threaded hole provided in said master, said flat headed screw having an enlarged head portion engagable with said insert when said insert is mounted to said master.

15. A multiple segmented chuck jaw as defined in claim 14 wherein dovetail means is a dovetail groove and said flex means comprises a slot formed in the base of said dovetail groove and extending longitudinally of said master.

16. A master for a multiple segmented chuck jaw as in claim 15 wherein said slot extends perpendicular to the major axis of said dovetail groove.

17. A multiple segmented chuck jaw comprising:

an insert including a first surface and a second surface, said first surface being at least in part contoured to conform to a surface of a workpiece to be engaged thereby, said second surface having dovetail means formed thereon;

a master including a first face having dovetail means formed thereon, the dovetail means on said master being complementary in shape to said dovetail means of said insert whereby said master and said insert may be joined together in secured relation, said master further including flex means for exerting gripping force on said insert when said dovetail means of said master and said insert are engaged; and stop means, said stop means being defined by a surface on said insert and a surface on said master, the stop means surface of said master contacting the stop means surface of said insert to determine the location of said insert relative to said master when said dovetail means of said master and said insert are engaged, said stop means including a flat headed screw threadably engageable in a threaded hole provided in said master, said flat headed screw having an enlarged head portion which defines the stop means surface of said master, said screw head portion engaging the stop means surface of said insert.

18. A segmented jaw for a workpiece holding chuck comprising:

a replaceable insert, said insert having a first surface at least partly contoured to conform to a surface of a workpiece to be supported in the chuck, said insert further having a second surface disposed oppositely to said first surface, said second surface having dovetail means formed thereon;

a jaw master, said master comprising a body including a first face having dovetail means formed thereon which engage said dovetail means of said insert for securing said insert to said master, said master body being flexible in a region adjoining said first face whereby the gripping force exerted on said insert by said master when said dovetail means are engaged may be selectively increased;

a threaded hole in the body of said master; and a threaded fastener, said fastener having a thread complementary to the thread of the hole in said body of said master, said fastener having an enlarged end portion with a flat surface thereon, said flat surface contacting said insert and defining an adjustable stop located adjacent to said dovetail means of said body to thereby determine the location of said insert relative to said master.

19. The apparatus of claim 18 wherein said master body flexible region is defined by a first slot extending inwardly from said dovetail means.

20. The apparatus of claim 19 wherein said dovetail means on the first face of the body of said master comprises a dovetail slot and wherein said first slot extends into said body in a direction perpendicular to the major axis of said dovetail slot to impart said flexibility to said body.

21. The apparatus of claim 18 wherein said dovetail means of said insert comprises a tenon.

* * * * *